Figure 1:
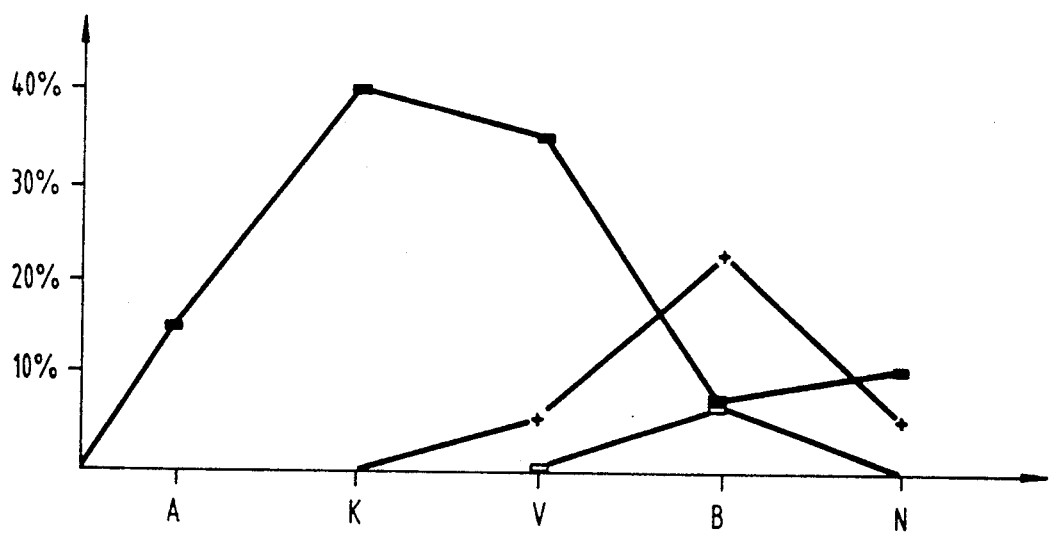

United States Patent [19]

Nader et al.

[11] Patent Number: 5,173,187

[45] Date of Patent: Dec. 22, 1992

[54] METHOD FOR CONTROL AND MONITORING OF ACTIVATED SLUDGE IN A BIOLOGICAL CLARIFICATION SYSTEM

[75] Inventors: Werner Nader, Heidelberg; Carl T. Nebe; Gerhard Nebe, both of Ladenburg; Christian Birr, Heidelberg, all of Fed. Rep. of Germany

[73] Assignee: Orpegen Medizinisch-Molekularbiologische Forschungsgesellschaft m.b.H., Heidelberg, Fed. Rep. of Germany

[21] Appl. No.: 327,770

[22] Filed: Mar. 23, 1989

[30] Foreign Application Priority Data

Mar. 31, 1988 [DE] Fed. Rep. of Germany ....... 3811097

[51] Int. Cl.$^5$ .................................................. C02F 3/34
[52] U.S. Cl. ..................................... 210/614; 210/745; 210/903; 210/906; 436/172
[58] Field of Search ............... 210/610, 611, 614, 739, 210/745, 96.1, 903, 906; 435/267; 436/62, 146, 164, 172; 422/79

[56] References Cited

U.S. PATENT DOCUMENTS 3,684,702  8/1972  Hartmann ........................... 210/614
4,564,453  1/1986  Coplot et al. ....................... 210/614
4,584,277  4/1986  Ullman ................................ 436/172
4,599,307  7/1986  Saunders et al. ................... 436/172
4,620,930  11/1986  McDowell ......................... 210/614
4,986,916  1/1991  Hickey .............................. 210/614

Primary Examiner—Thomas Wyse
Attorney, Agent, or Firm—Felfe & Lynch

[57] ABSTRACT

The present invention provides a process for the control of a biological clarification stage of the aerobic activated sludge type, wherein at least one of the microorganisms most frequently present in the activated sludge is continuously monitored with regard to the amount thereof in that, in a representative sample from the activated sludge and/or from the inlet of the activated sludge tank, this micro-organism is bound to fluorescence-labelled antibodies directed against the chosen micro-organism or this micro-organism is allowed to react with a fluorogenic substrate by means of a special metabolic ability, the amount of the thus fluorescence-labelled micro-organism is determined by flow cytometry and, at the same time, the total amount of the micro-organism present is determined by scattered light measurement and/or coloration of the DNA and, depending upon the measurement values thus obtained, the amount of at least one particular micro-organism and/or the growth conditions for this micro-organism is regulated.

9 Claims, 12 Drawing Sheets

- AEROMONAS HYDROPILA
+ ACINETOBACTER SSP.
▫ PSEUDOMONAS ORYZIHABITANS

A : WASTE WATER  -  K : CANALIZATION  -  V : PRE-CLARIFICATION TANK
B : ACTIVATED SLUDGE TANK  -  N : POST-CLARIFICATION TANK

■ AEROMONAS HYDROPILA
+ ACINETOBACTER SSP.
▫ PSEUDOMONAS ORYZIHABITANS

A : WASTE WATER   -   K : CANALIZATION   -   V : PRE-CLARIFICATION TANK
B : ACTIVATED SLUDGE TANK   -   N : POST-CLARIFICATION TANK

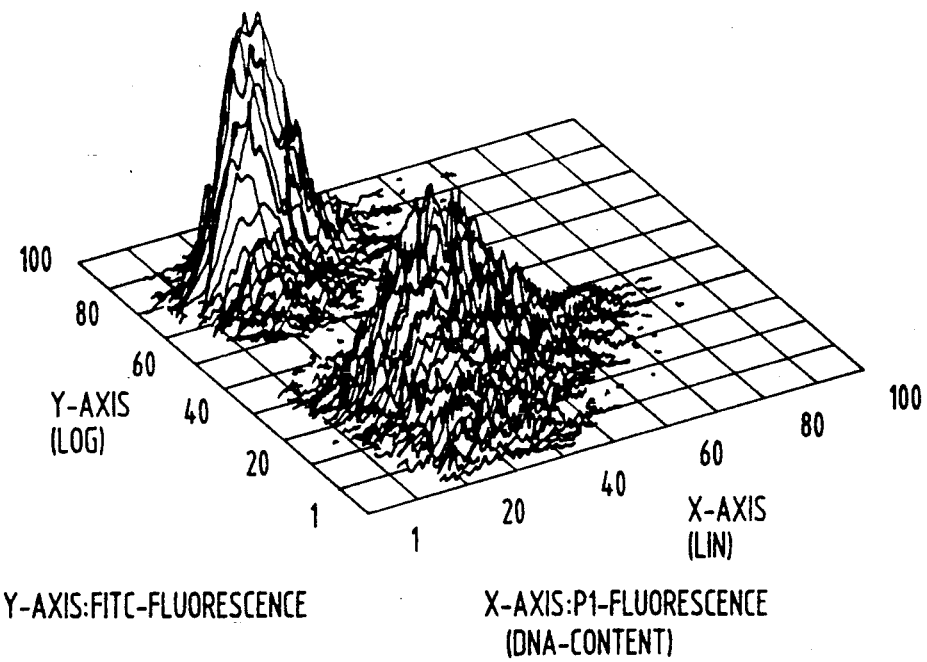

COLOR OF AEROMONAS HYDROPHILA

MIXTURE: AEROMONAS + ANTIBODY (ORPEGEN D23)
AEROMONAS + O-SERUM

FILE: WN0714.2

CELLS TREATED FOR 2 HOURS
WITH CHLORAMPHENICOL

P2 GRN-FL/Y VS RED-FL/X  R1

P3 GRN-FL/Y VS RED-FL/X  R2

L4 RED FLUORESCENCE

COLOR OF PRE-CLARIFIED SLUDGE

FILE : IB1507.3  ANTIBODY : D23/0-SERUM

| HIST | COUNT | %TOT | PX | PY | MX | MY | SDX | SDY | CORR |
|------|-------|------|-----|-----|-----|------|-----|-----|------|
| P2 4 | 14811 | 16.8 | 580 | 680 | 609 | 73.3 | 5.5 | 6.9 | .255 |

HISTOGRAM      : P2
TILT ANGLE     : 50
ROTATION ANGLE :-30
COUNT THRESHOLD : 1
COUNT SCALE    : 1
GRID INTENSITY : 4
PERIM. DISPLAY : OFF

COLOR OF PRE-CLARIFIED SLUDGE

FILE : IB1507.3   ANTIBODY : D23

| HIST | COUNT | %TOT | PX | PY | MX | MY | SD X | SD Y | CORR |
|------|-------|------|-----|-----|------|------|------|------|------|
| P2 4 | 29207 | 33.4 | 600 | 730 | 62.1 | 77.7 | 5.8  | 8.0  | .517 |

HISTOGRAM        : P2
TILT ANGLE       : 50
ROTATION ANGLE   : -30
COUNT THRESHOLD  : 1
COUNT SCALE      : 1
GRID INTENSITY   : 4
PERIM. DISPLAY   : OFF

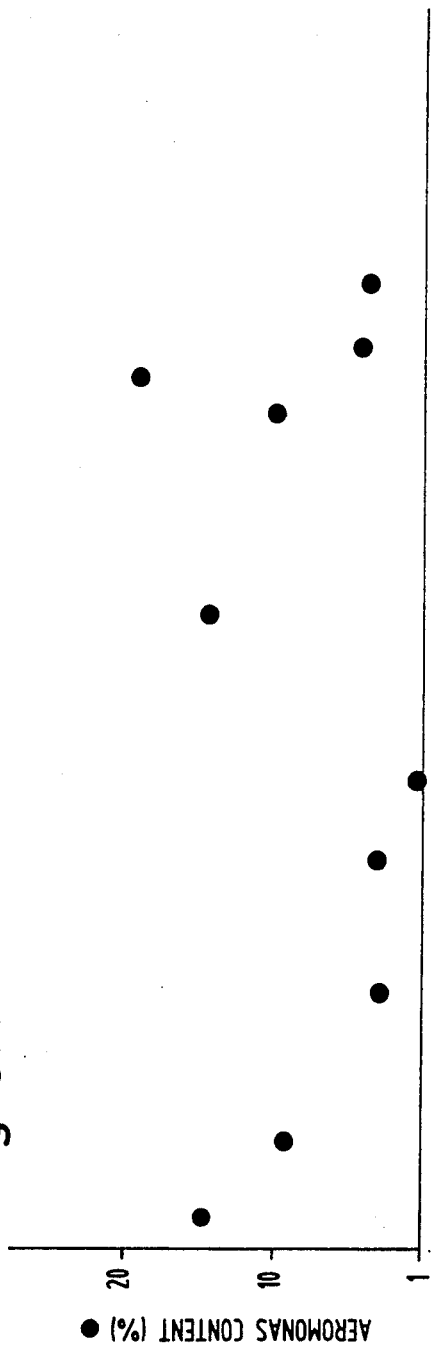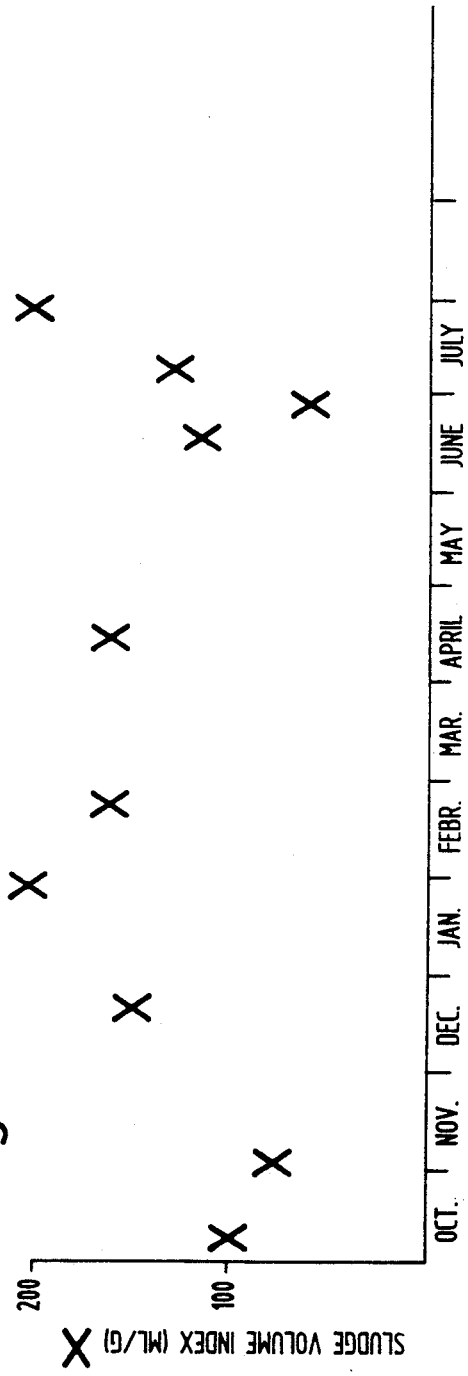

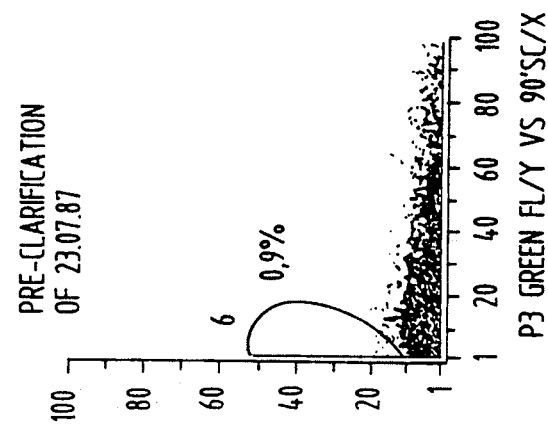
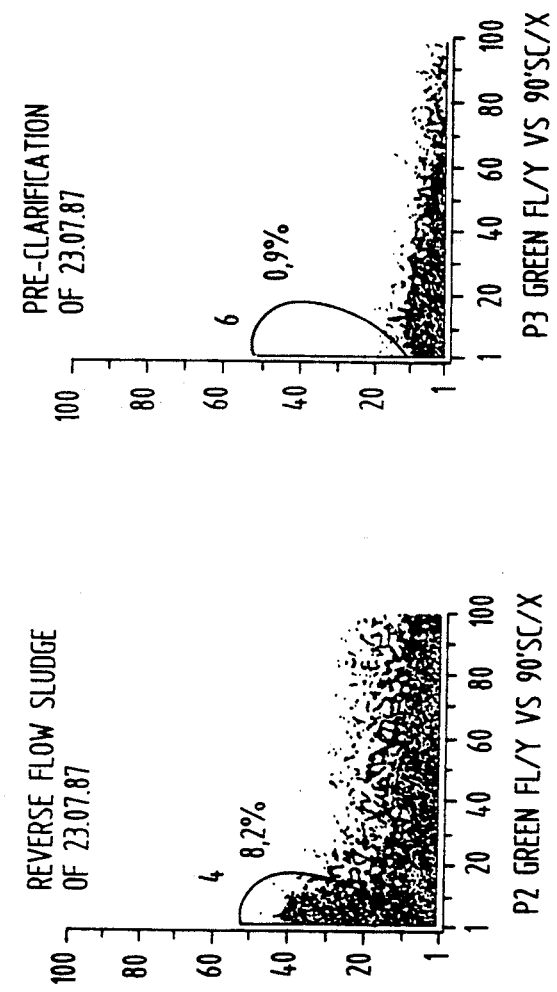
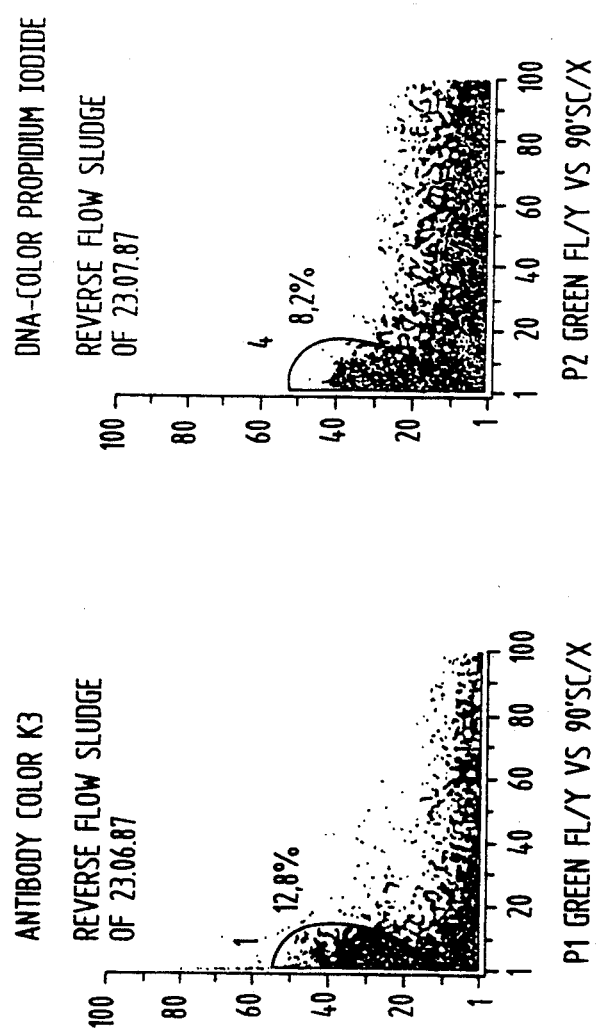

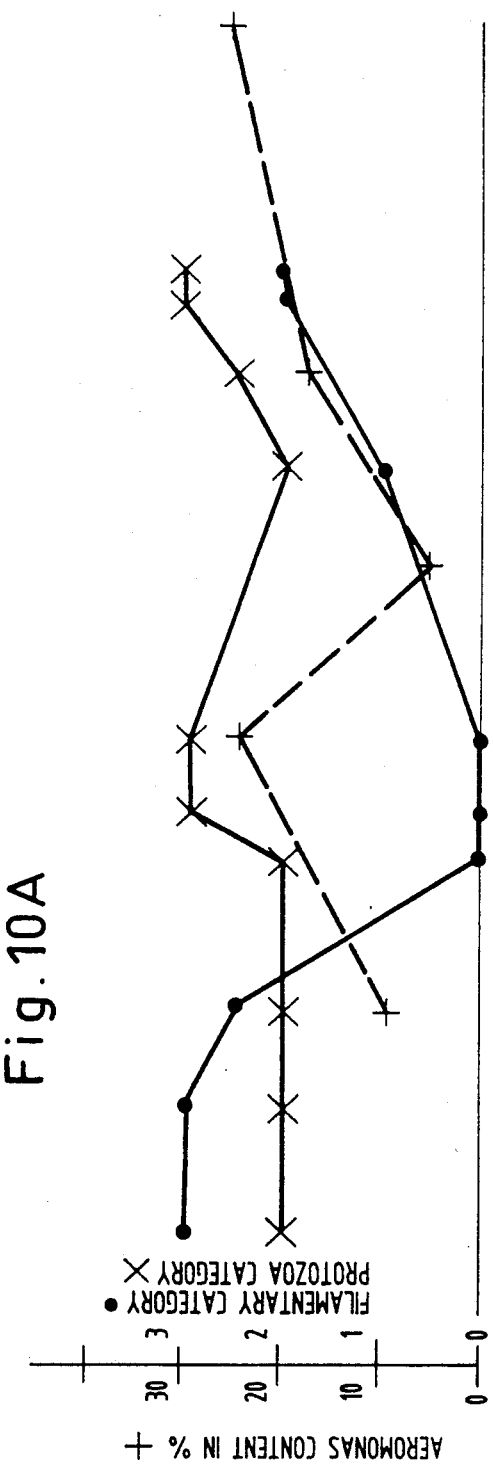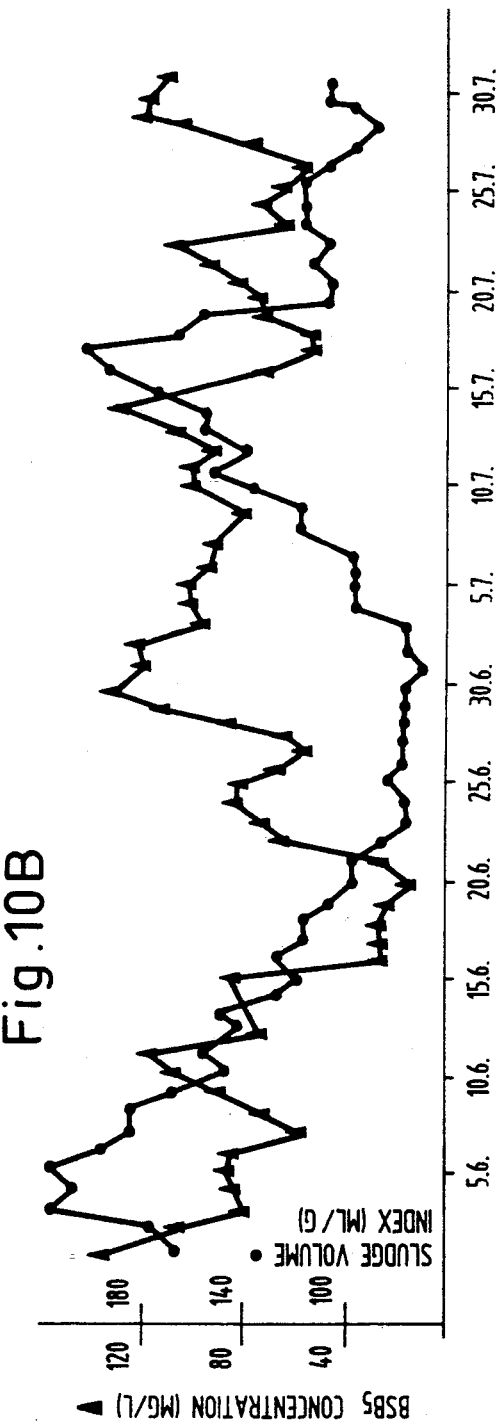

METHOD FOR CONTROL AND MONITORING OF ACTIVATED SLUDGE IN A BIOLOGICAL CLARIFICATION SYSTEM present invention is concerned with a process for the control of biological clarification steps and for the isolation of bacteria with relevant metabolic properties.

The processing of water and removal of commercial, industrial and domestic waste water takes place in sewage treatment plants. Modern plants of this kind usually have mechanical, biological and chemical clarification steps, the automatic control of the course of the process by regulating circuits being of the greatest importance.

In the case of biological breakdown, thus in biological clarification steps, there is obtained the so-called activated sludge which consists of a mixed population of micro-organisms (bacteria, protozoa and possibly also fungi and yeasts), the composition of which is determined by the nature of the available nutrients and conditions of the medium (temperature, pH value, osmotic pressure and the like).

The activated sludge, upon which depends the function of the aerobic purification step of a clarification plant, is thus a combination of highly specialized micro-organisms, each organism of this combination fulfilling its own function in the decomposition of the components of the waste water and its occurrence in the activated sludge tank being conditioned by the composition of the waste water and the physical and chemical conditions in the activated sludge tank, such as the degree of acidity, temperature and oxygen partial pressure.

The waste water purification in the biological clarification step is thus a biotechnological process and an extensive knowledge of the biology of the activated sludge tank and microbiological possibility of intervention is, therefore, an important prerequisite for the improvement and control of the waste water purification.

Conventional microbiological methods of analysis such as have already been carried out, for example, for biological sludge investigations (cf. M. Baumann and H. Lemmer, Korrespondenz Abwasser, 12, 1232–1239/1986; H. Seiler et al., Z. f. Wasser-Abwasser-Forsch., 17, 127–133/1984) do not suffice for a rapid and dependable qualitative and quantitative detection of most bacteria and sludge flocks. The methods of quantification depending upon the transfer to culture plates involve high error factors and can only be regarded as being semi-quantitive. Therefore, as an alternative, methods based on immunofluorescence have been developed. Thus, for example, B. B. Ward and M. J. Perry (Appl. Environ. Microbiol., 39, 913–918/ 1980) describe the determination of the ammoniumoxidizing bacterium *Nitrosococcus oceanus* in sea water by means of immunofluorescence. B. B. Bohlool and E. L. Schmidt (Science, 162, 1012–1014/1968) describe the investigation of soil samples by means of immunofluorescence.

Only if it were possible to determine within the course of a few hours (hitherto several weeks were necessary) the bacteria which are important for waste water purification would this provide not only an enormous increase of the knowledge of the dynamic growth behaviour and the importance of these organisms but also new microbiological regulation values would thereby be found with the help of which the operator of a clarification plant could, by means of conventional process technology, maintain constant or improve the purification power of the activated sludge tanks. Those micro-organisms could also be found which provide especially positive performances. These could be grown outside of the activated sludge tank and then again introduced into the tank.

Therefore, it is an object of the present invention to provide a process for the control of a biological clarification plant with which a rapid and dependable determination of micro-organisms and thus a control of the clarification plant is possible. This object is achieved by the process according to the present invention.

Thus, according to the present invention, there is provided a process for the control of a biological clarification stage of the aerobic activated sludge type, wherein at least one of the micro-organisms most frequently present in the activated sludge is continuously monitored with regard to the amount thereof in that, in a representative sample from the activated sludge and/or from the inlet of the activated sludge tank, this micro-organism is bound to fluorescencelabelled antibodies directed against the chosen microorganism or this micro-organism is allowed to react with a fluorogenic substrate by means of a special metabolic ability, the amount of the thus fluorescencelabelled microorganism is determined by flow cytometry and, at the same time, the total amount of the microorganism present is determined by scattered light measurement and/or coloration of the DNA and, depending upon the measurement values thus obtained, the amount of at least one particular micro-organism and/or the growth conditions for this micro-organism is regulated.

According to a preferred embodiment of the present invention, at least one of the following micro-organisms is monitored: type 021N, 0961 and 1852, *Sphaerotilus natans, Zoogloa spec., Pseudomonas oryzihabitans*, isolates of *Acinetobacter calcoaceticus; Nitrosomonas spec., Nitrobacter spec., Aeromonas hydrophila, Acinetobacter calcoaceticus; Acinetobacter spec., Pseudomonas aeruginosa, fluorescens* and *putida, Arthrobacter spec., Rhodococcus spec., Salmonella spec., Pasteurella spec., Shigella flexneri, Pseudomonas aeruginosa; Escherichia coli, Aeromonas hydrophila, Klebsiella pneumoniae* and *Pseudomonas fluorescens*.

According to another preferred embodiment of the present invention, at least one micro-organism is monitored which is responsible for swollen sludge, nitrification, biological dephosphatisation, metabolism of substances which are difficult to break down, infections of humans and animals and/or for the assessment of the quality and origin of the waste water introduced.

According to yet another preferred embodiment of the present invention, dephosphatising- and/or nitrification-regulating micro-organisms are selected.

The production and binding of the antibodies directed against the selected micro-organisms can be carried out in known manner such as is conventional in the case of immunofluorescence (cf. Roempp, Chemie-Lexikon, 8th edn., p. 1844; B. B. Ward and M. J. Perry, loc. cit.).

Fluorogenic substrates for the labelling of a specific metabolic performance, i.e. one peculiar to only a particular micro-organism, are commercially available (for example fluorescein diacetate (esterase indicator), fluorescein-$\beta$-glucoronide (indicator for the glucoronidase specific for *Escherichia coli*), fluorescein-$\beta$-galactoside (indicator of galactosidase)) but can also be synthesised in known manner.

Thus, for example, the cleavage of fluorescein diacetate characterises the occurrence of esterases in bacteria and fluorescein-β-glucoronide permits a specific detection for glucoronidases in *Escherichia coli*. From nonfluorescent substrates, after enzymatic cleavage, there is, in general, liberated a fluorescent product (for example fluorescein, Texas Red or the like). Such reactions can characterise groups as well as also individual species of bacteria and also permit the isolation thereof by means of "fluorescence activated cell sorting".

According to the present invention, by means of such fluorogenic substrates, intracellular metabolic performances can be indicated and quantified by flow cytometry or microscopic image analysis.

Flow cytometry (flow cytometry with laser or mercury or xenon lamp excitation, flow cytometry, FCM) is a generally known and frequently used method for the analysis of cells of all kinds, whereby several parameters, such as DNA, RNA and protein content, immunofluorescence, cell size and cell shape can be measured simultaneously (cf., for example, Biotechnology, 3, 337–356/1985; company brochure "Zytometry" of Orpegen medizinisch-molekularbiologische Forschungsgesellschaft mbH, Heidelberg; for the construction of the apparatus also the company brochure of Skatron A/S, N-3401 Lier). The choice of the process and apparatus embodiments used for the process according to the present invention depends, therefore, especially upon the specific sample to be investigated and the sample preparation, upon the nature of the micro-organism and the like.

For the preparation for flow cytometry, the samples are first to be freed from disturbing accompanying materials, for example algae and other components which can influenca the measurement result, and, for this purpose, are pre-treated in an appropriate manner. For the sample preparation, the bacteria are isolated, then washed, preferably by centrifuging, and fixed in alcohol. The bacteria are then subjected to a treatment for the hydrolysis of the ribonucleic acids (with maintenance of the deoxyribonucleic acid), for example by treatment with alkaline 70% alcohol, thereafter nonspecific antibody binding positions are saturated (for example by transfer into alkaline-hydrolysed 2% gelatine) and antiserum is then added thereto and allowed to act. The bacteria are then washed, for example by centrifuging, and incubated with the fluorescence-labelled antibody (preferably pig anti-rabbit antibody antibodies).

For the fluorescence labelling of a metabolic performance, the sample is first isolated but then not fixed but rather incubated directly with the fluorogenic substrate. After again washing, the desoxyribonucleic acid is coloured with a fluorescence dyestuff (for example propidium iodide). Thereafter, measurement is carried out in a laser flow cytometer (for example of the firm Ortho Diagnostics or Becton-Dickinson, Coulter or Bruker-Odam) or, for example, also in a mercury vapour lamp flow cytometer (for example of the firm Skatron).

Thus, with the process according to the present invention, there is provided a new process for the control of biological clarification plant operating according to the activated sludge system in which the control takes place by the quantitative determination of various leading organisms, whereby, depending upon the measurement values, there is then either dosed in the micro-organisms present in too small an amount or the growth conditions for these micro-organisms are improved or both measures are applied simultaneously.

In the flow cytometer itself, which is advantageously to determine not only the bacteria in the run-in to the clarification plant but also from the activated sludge tanks themselves, for a reasonably useful quantification, there must be co-determined, besides the leading micro-organisms, also the total amount of the micro-organisms. This can take place simultaneously by measurement of the light scattering which, however, apart from the micro-organisms, can also include other fine particles (therefore empirically determined correction factors are possibly to be taken into account), or by colouring the DNA of the microorganisms, the two colour signals then being determined simultaneously. Scattered light determination and coloration via the DNA are preferably carried out in parallel since the exactitude can hereby be further increased.

The regulation or improvement of the growth conditions can take place especially, for example, by means of appropriate adaptation of nutrient supply, of the pH value and/or of the temperature and can possibly also include further regulation possibilities. If the nutrient supply is too low, this can be increased, for example, by the addition of cheap sources of protein, for example abattoir waste, waste blood and the like, or artificial fertilizers.

The pH value control can take place in a manner known for changing the pH value, for example by the addition of appropriate acids or bases. A temperature regulation, which under normal conditions usually consists of a temperature increase, can take place, for example, via the temperature of the pressurised air used for the aeration.

As bacteria which are especially important and very suitable for clarification plant control, there are to be mentioned, arranged according to the problem areas: Type 021N, 0961 and 1852, *Sphaerotilus natans, Zoogloa spec., Pseudomonas oryzihabitans,* isolates of *Acinetobacter calcoaceticus; Nitrosomonas spec., Nitrobacter spec., Aeromonas hydrophilia, Acinetobacter calcoaceticus; Acinetobacter spec., Pseudomonas aeruginosa, fluorescens* and *putida, Arthrobacter spec., Rhodococcus spec., Salmonella spec., Pasteurella spec., Shigella flexneri, Pseudomonas aeruginosa; Escherichia coli, Aeromonas hydrophilia, Klebsiella pneumoniae,* and *Pseudomonas fluorescens.*

Of these, certain bacteria are to be assigned to certain problem areas, for example, the formation of intumescent sludge, the oxidation of ammonium to nitrate, the elimination of phosphate, the metabolising of substances which are difficult to break down (for example aromatics, halogenated hydrocarbons, aliphatics and detergents), the elimination of micro-organisms which are pathogenic for humans and animals and the assessment of the quality and origin of the waste water introduced; by means of a suitable selection of bacteria regulating the individual problems, a control and regulation of these problems is possible, for example the dephosphatising and the nitrification. In this way, for example, the dephosphatising and/or nitrification can be controlled and regulated separately in that the micro-organisms responsible for the breakdown are dosed in or their specific growth conditions are changed. Furthermore, via a fluorogenic substrate, bacteria which are capable of particular metabolic accomplishments can be labelled and isolated by means of "fluorescence activated cell sorting". Thus, without laborious screening and selection processes, particular breakdown specialists, for example those which metabolise substrates which are difficult to break down, can be isolated, cultured outside of the clarification plant and again introduced into the activated sludge tanks.

In the following, the present invention is explained in more detail using the example of a clarification plant but without limiting it thereto.

For the analysis of the bacterial biocoenosis of a clarification plant with the object of being able to describe its dynamic growth behaviour, there was first carried out an isolation and characterisation of the participating micro-organisms with the conventional microbiological methods, namely, for each bacteria which break down the organic dirt load of the waste water.

The following Table 1 shows the bacterial strains which were isolated and identified in pure form from the biocoenosis of an investigated clarification plant in the period from October 1986 to July 1987.

TABLE 1

Bacterial strains which were isolated and identified in pure form from the biocoenosis of a clarification plant in the period from October to July

| genus | species | No.*) | subspecies | estimated frequency | occurrence |
|---|---|---|---|---|---|
| Acinetobacter | calcoaceticus | 1 | anitratus wolffii | 5–20% | |
| Aeromonas | caviae | 2 | | ve | from canalisation and pre-clarification |
| | hydrophila | 3 | | 0–15% | |
| | salmonicida | 4 | | ve | |
| Alcaligenes | faecalis | 5 | odorans | 1% | |
| | denitrificans | 6 | | | |
| Arthrobacter | spec. | 7 | | 1–10% | |
| Bacillus | spec. | 8 | | ve | typical soil bacterium with permanent spores |
| Enterobacter | agglomerans | 9 | | | typical intestinal bacteria |
| | omniserus | 10 | | ve | |
| | cloacae | 11 | | | |
| Escherichia | coli | 12 | | ve | typical intestinal bacterium |
| Flavobacterium | spec. | 13 | | 1–5% | |
| Klebsiella | pneumoniae | 14 | pneumonia ocaenae | 2.5–20% | from canalisation and pre-purification |
| Micrococcus | luteus. | 15 | | | |
| | varians | 16 | | 1–10% | |
| | roseus | 17 | | | |
| Moraxella | spec. | 18 | | 1–10% | |
| Pasteurella | aerogenes | 19 | | | commensals of humans and animals |
| | multicida | 20 | | ve | |
| Proteus | mirabilis | 21 | | 1–3% | from canalisation and pre-clarification |
| | vulgaris | 22 | | | |
| Pseudomonas | acidovarans | 23 | | ve | |
| | aeruginosa | 24 | | ve | |
| | alcaligenes | 25 | | about 10% | |
| | fluorescens | 26 | | about 15% | |
| | luteola | 26 | | 1% | |
| | paucimobilis | 27 | | 1% | |
| | putida | 28 | | 1% | |
| | putrefaciens | 29 | | 1% | |
| | oryzihabitans | 30 | | 0–8% | |
| | stutzeri | 31 | | ve | |
| Rhodococcus | spec. | 32 | | 1% | |
| Salmonella | flexneri | 33 | | | intestinal bacterium mostly pathogenic for humans |
| | paratyphi B | 34 | | 0.5% | |
| | sonnei | 35 | | | |
| | typhi | 36 | | | |
| Sigella | flexneri | 37 | | | intestinal bacterium pathogenic for humans |
| Sphaerotilus | natans | 38 | | 0.5% | filamentary bacterium, together with 021N and 0961, cause of intumescent sludge in winter in Klarwerk Nord |
| Staphylococcus | aureus | 39 | | 1% | commensals of humans and animals frequently pathogenic |
| Streptococcus | spec. | 40 | | 1% | commensals of humans and animals frequently pathogenic |
| Xanthobacter | spec. | 41 | | 0.3% | |
| Xanthomonas | spec. | 42 | | 1% | |
| Yersinia | enterolytica | 43 | | ve | |
| Vibrio | cholerae | 44 | | | |
| | fluvialis | 45 | | ve | |
| Zooglöa[a)] | spec. | 46 | | more than 10% | |
| | | | | which are not classified taxonomically | |
| Type 021N | | 47 | | 0–50% | filamentary bacterium and cause of intumescent sludge |
| Type 0961 | | 48 | | 0–10% | filamentary bacterium and cause of intumescent sludge |
| Type 1852 | | 49 | | 0–2% | filamentary bacterium and cause of intumescent sludge |

From Table 1, it can be seen that a plurality of bacterial strains are encountered in the clarification plant. Therefore, for a description of the dynamic state of the clarification plant, a limitation to a few important leading organisms is unavoidable. For the recognition of the leading organisms, a semi-quantitative determination of the main bacterial groups was carried out with conventional methods and three organisms selected on the basis of their growth behaviour in the canalisation, preclarification and in the active sludge tanks (see FIG. 1 of the accompanying drawings).

The quantitative determination of bacteria in a mixture of conventional methods is mainly based on the plating process (cf. M. Baumann and H. Lemmer, loc. cit.) in which bacteria are coated on to the nutrient surface of agar-agar in a petri dish, grown on this agar-agar to give cultures and then counted and isolated. In an improved process for the analysis of main bacterial groups (the so-called punch method), clarification sludge bacteria are first singled out by shearing forces in a homogeniser and then plated out on to agar-agar. The material is diluted to such an extent that well singled-out colonies grow on the agar-agar and then, with a punch, the agar-agar is transferred to new plates with selective media. These selective media contain various inhibiting materials which are only tolerated by particular species (cf. also H. Seiler et al., loc. cit.). Furthermore, colour indicators are present, the colour change of which indicates the special metabolic-physiological performance of the bacterium. Because of the punch transfer, each individual colony can be traced back to the starting plate. For each bacterium, information is obtained regarding resistance to inhibiting materials, metabolicphysiological performance and content of characteristic enzymes. On the basis of this information, it is then possible to assign each individual colony on the starting plate to one of the following groups: 1. grampositive bacteria of the genus *Micrococcus, Arthrobacter* and *Rhodococcus* in the aerobic clarification plant region and *Staphylococcus* and *Streptococcus* in the anaerobic region and in the canalisation; 2. *Enterobacteriaceae* (intestinal bacteria) and *Acinetobacter*; 3. *Pseudomonaceae* and *Moraxella*; *Aeromonas*.

However, the above-described methods involve an important disadvantage for waste water analyses: only 10 to 20% of the bacteria in the homogenizate counted under the microscope subsequently grow on the plate culture. Experiments with the vital dyestuff Rhodamine 123 show that over 90% of the bacteria in the microscopic preparation are alive and are metabolically active. This poor cultivation efficiency on agar-agar plates is due to the fact that not all bacteria survive undamaged the transfer from the liquid waste water medium to the solid agar-agar surface. The nitrifying ones cannot grow at all on agar-agar. This shows that the frequencies determined with the punch method can definitely involve a tenfold degree of error. Therefore, all quantification methods depending upon the transfer of culture plates can only be regarded as being semi-quantitative.

Use of flow cytometry for clarification plant bacteria (process according to the present invention)

a) By means of immunofluorescence, bacteria in a mixture can be specifically labelled and thus individual types of bacteria can be detected qualitatively under a fluorescence microscope, also quantitively with an image analysis system and then quantitatively in a flow cytometer.

For the determination by means of immunofluorescence, specific antibodies against the bacterial strains to be detected are produced and coupled to a fluorescence coloured material. After incubation of the bacterial mixed culture with these antibodies, only the appropriate bacteria are fluorescently coloured and can be detected under a fluorescence microscope.

The production of polyclonal or monoclonal antibodies which are needed for this technique takes place according to known processes which do not need to be further explained here. In principle, bacteria from a pure culture are killed, injected into an experimental animal (rabbit or mouse) and the antiserum obtained therefrom or B-lymphocytes isolated therefrom and used for the hybridoma technique.

Although the production of monoclonal antibodies according to the hybridoma technique is much more laborious than the obtaining of antisera, it has two decisive advantages: 1. from a rabbit there can only be obtained a limited amount of antiserum, whereas the B-lymphocytes can be stimulated to an unlimited production of the antibody; 2. already shortly after birth, the experimental animals have formed an immune response against bacteria of the skin, of the intestines and of the drinking water and precisely these bacteria occur in large amounts in waste water samples. In the case of clarification sludge investigations, this also leads to an undesired labelling of these bacteria. In the case of monoclonal antibodies, this problem does not exist.

b) Analysis of immunofluorescent-coloured activated sludge samples under a fluorescence microscope.

Working is according to the method of B. B. Bohlool and E. L. Schmidt (Science, 162, 1012–1014/1968). With fluorescing antibodies directed against *Rhizobium* (a bacterium important for nitrogen fixation), these authors have specifically detected soil bacteria in soil samples. The non-specific binding of the antibodies to the electrostatically charged soil particles was thereby suppressed by pre-incubation with alkaline hydrolysed gelatine. This process was applied to an activated sludge sample. After intravenous injection of killed bacteria of the strains *Acinetobacter* and *Aeromonas* into experimental rabbits, the antibodies were obtained from their sera. Activated sludge samples were applied to microscope slides, dried at 60° C. and then fixed with 96% ethanol. The preparation was then covered with a film of alkaline hydrolysed gelatine, the antibodies applied, washed and then coated with a fluorescence-labelled antibody from pigs against rabbit immunoglobulin. Thus, all bacteria which had bound to the rabbit antibodies were fluorescent labelled.

Thus, within different activated sludge and waste water samples, *Acinetobacter* and *Aeromonas* could be detected and the frequency of their occurrence estimated.

c) Analysis of activated sludge bacteria labelled with immunofluorescence and DNA coloration with flow cytometry.

A decisive advantage of flow cytometry over fluorescence microscopy proved to be, for example, that in the case of blue light excitation, in addition to the green immunofluorescence signal, the red DNA fluorescence light and the light scattering of the bacteria could also be measured. Since, besides the fluorescence labelling by antibodies, DNA content and light scattering of a bacterial type are relatively constant values, the microorganism to be quantified can be precisely limited measurement technically within a total population. A substantial disadvantage of the fluorescence microscopy is thereby compensated for.

FIG. 2 of the accompanying drawings shows the measurement results for a mixture of pure *Acinetobacter* bacteria which have been coloured, on the one hand, with the zero serum of the rabbit and, on the other hand, with the serum after injection of killed-off cells of this strain. Two frequency distributions are to be recognised which are to be associated with the fluorescent and non-fluorescent bacteria. The DNA content of the bacteria is, as expected, graded the same by the flow cytometer. This measurement corresponds to the image under the fluorescence microscope.

The sample preparation took place according to the following flow diagram for the preparation of bacterial samples for flow cytometry:
1. Bacteria are singled out with a Dounce homogeniser, washed by centrifuging and fixed in 70% alcohol. 1.5 hours.
2. Thereafter, they are transferred into alkaline 70% alcohol which leads to the hydrolysis of the ribonucleic acids. On the other hand, the desoxyribonucleic acids remain intact. 1.5 hours.
3. Bacteria are washed by centrifuging and transferred to alkaline hydrolysed 2% gelatine, which leads to the blocking of non-specific antibody binding points. 1.5 hours.
4. Antiserum is added thereto and acts for 45 minutes. 1 hour.
5. Bacteria are washed by centrifuging and incubated with fluorescence-labelled pig anti-rabbit antibody antibodies for 15 minutes. 30 minutes.
6. Bacteria are washed and the desoxyribonucleic acid coloured with a fluorescence dyestuff, for example propidium iodide. 30 minutes.
7. Measurement in a laser flow cytometer or in a mercury and xenon lamp flow cytometer.

Figure 3A:
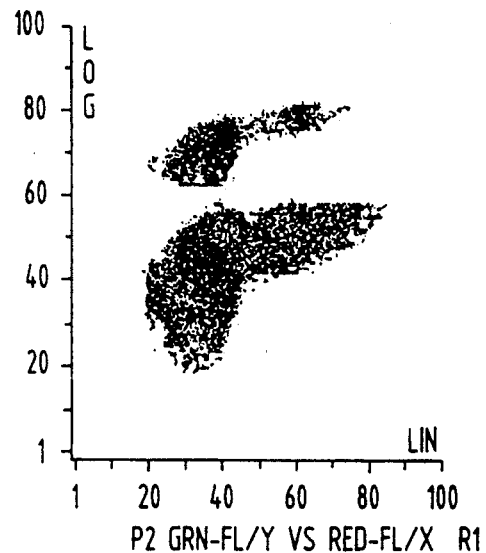
Figure 3B:
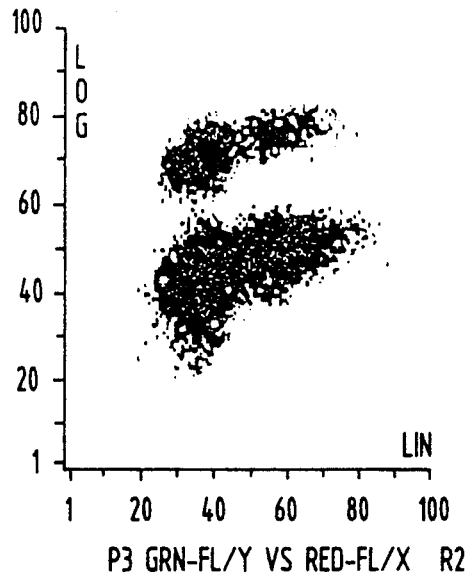
Figure 3C:
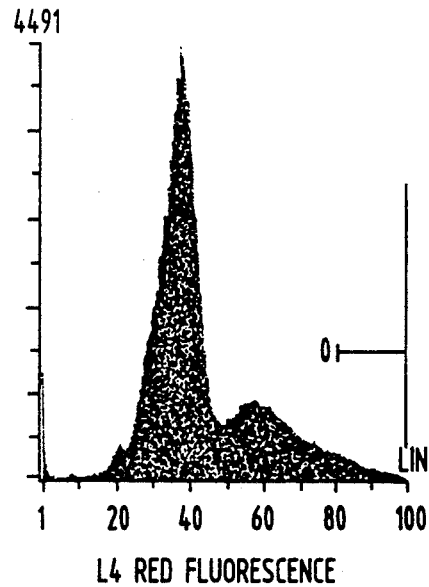

FIG. 3 of the accompanying drawings shows the measurement (frequency distribution) of a mixture of an *Aeromonas* pure culture coloured with zero serum and antiserum. *The Aeromonads* had been treated with chloramphenicol so that four different populations with a single and doubled DNA content or with or without immunofluorescence were to be recognised in the cytometer. The intensities of the green immunofluorescence and of the red DNA fluorescences are plotted in percent on the Y and X axis, respectively. Each point corresponds to a measured bacterium. By treatment of the cells with the antibiotic chloramphenicol, an additional provision was made that only *Aeromonads* with single or double DNA content occur. It can be seen that the measurement technique is even able to differentiate these bacterial subpopulations with single and doubled DNA content and with or without immunofluorescence.

Figure 4A:
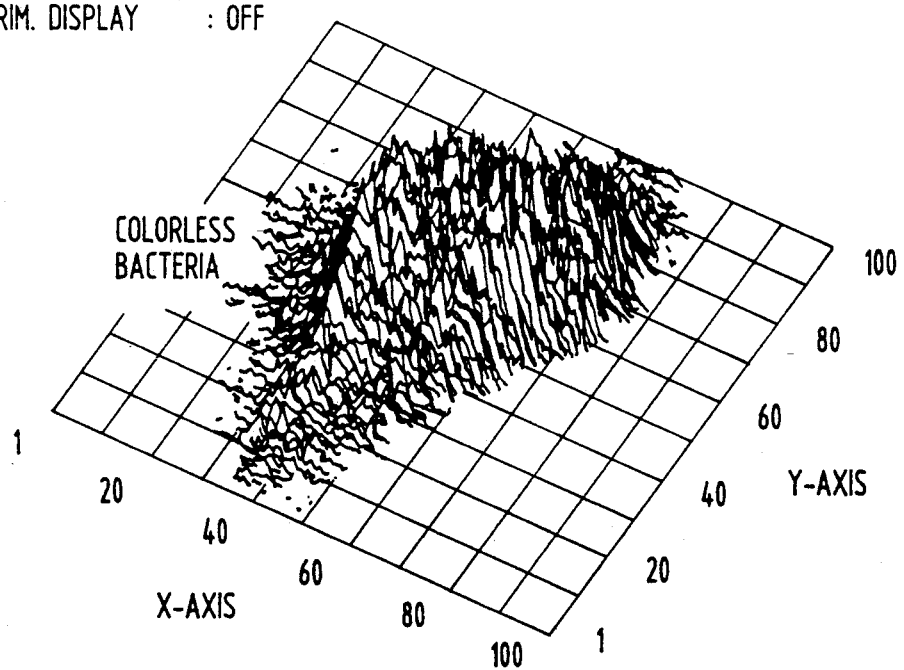
Figure 4B:
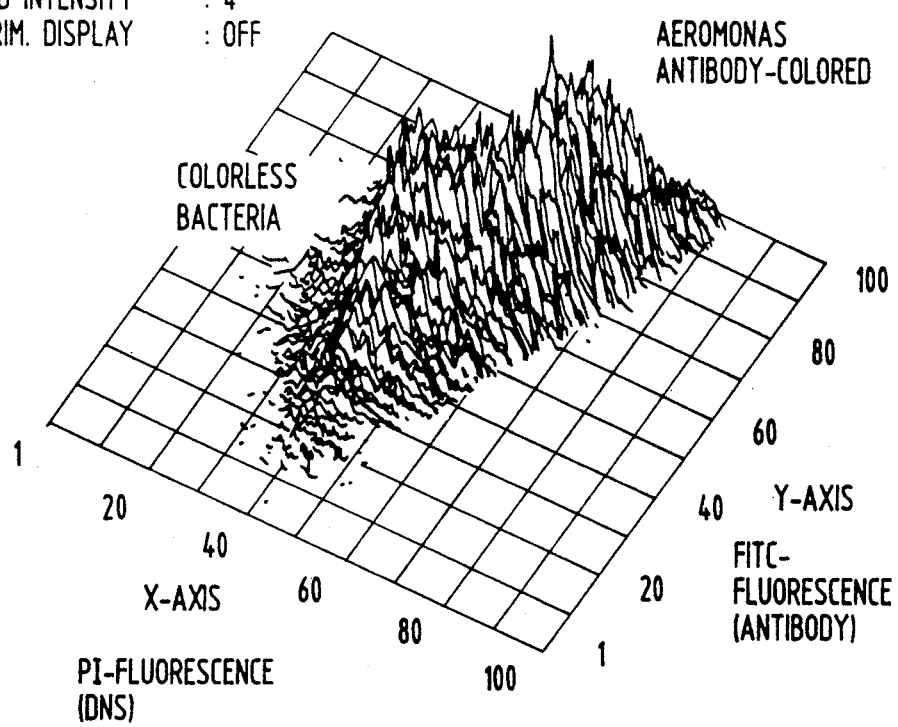

FIGS. 4a and 4b of the accompanying drawings show the measurement of *Aeromonads* in a preclarification tank with flow cytometry. The bacterial frequencies are plotted against the green immunofluorescence (Y-axis) and red DNA fluorescence (X-axis). In FIG. 4a, the bacterial mixture was coloured with zero serum and in FIG. 4b with specific *Aeromonas* antibodies.

Thus, the quantification of Aeromonads from a waste water sample is shown therefrom. Due to the immunofluoresence, the *Aeromonads* in FIG. 4b appear in a limited measurement region and can now be quantified.

Figure 5A:
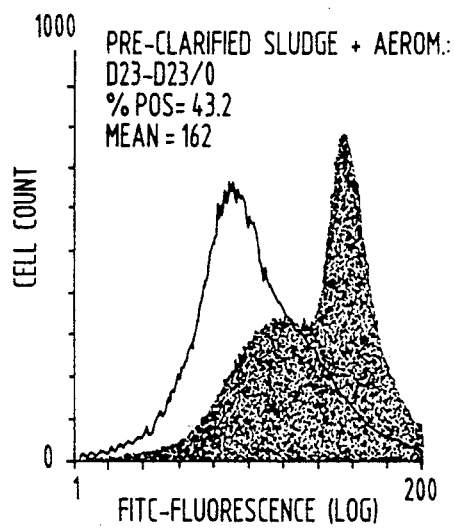
Figure 5B:
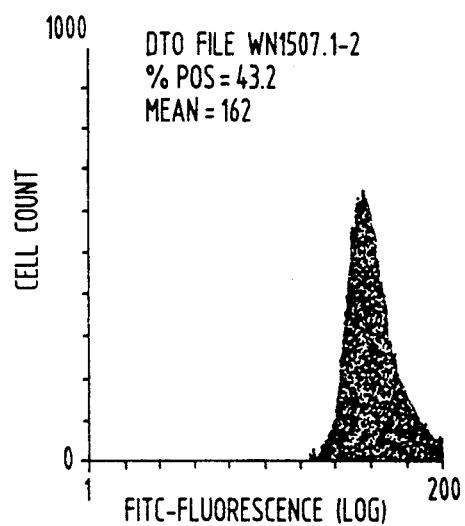
Figure 5C:
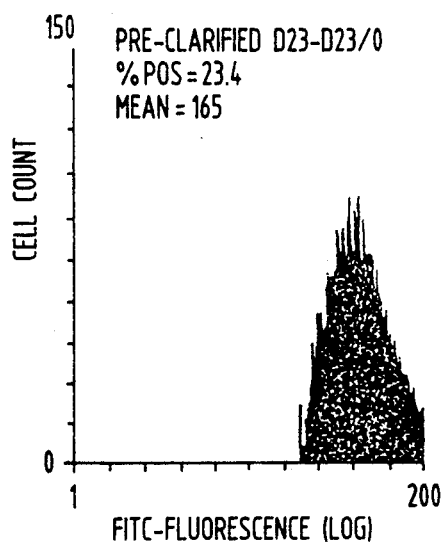
Figure 5D:
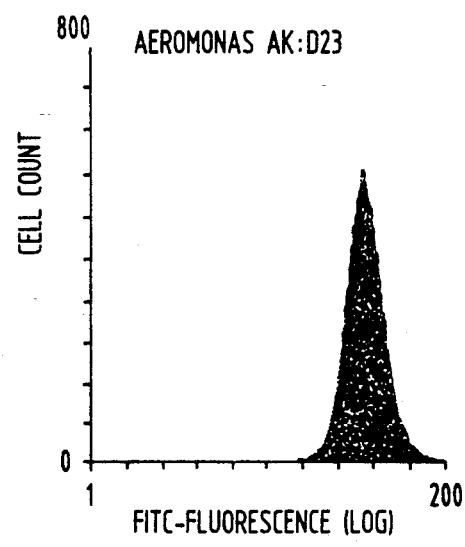
Figure 6A:
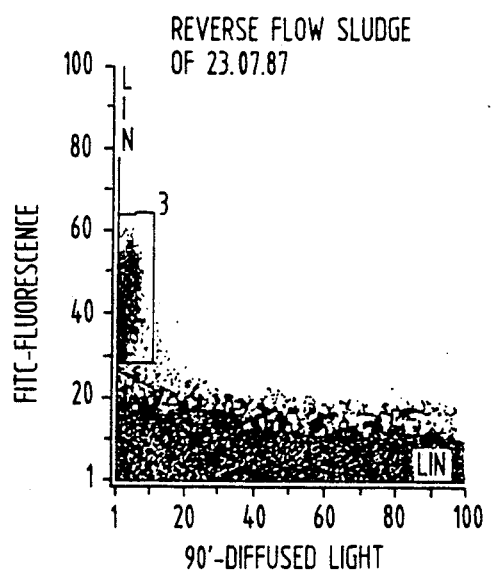
Figure 6B:
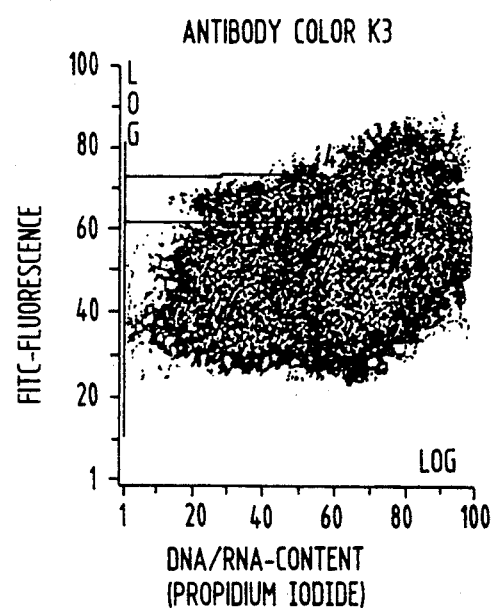
Figure 6C:
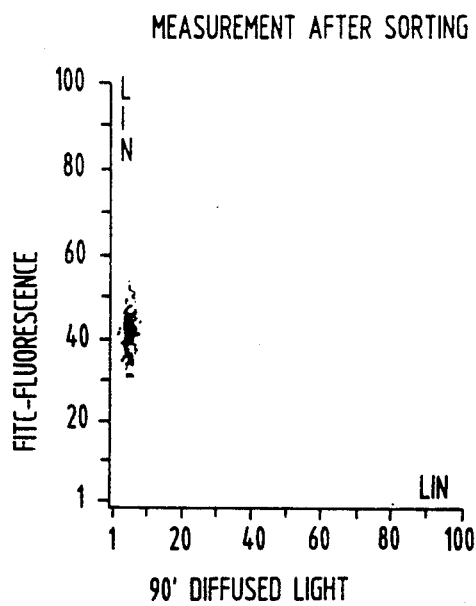
Figure 6D:
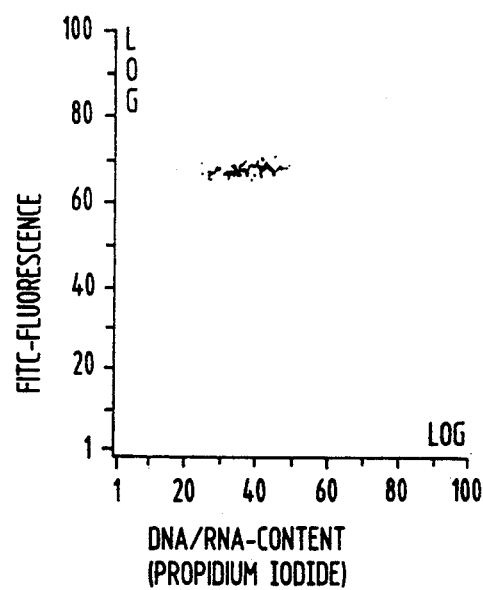

FIGS. 5a, b, c and d of the accompanying drawings show the quantification of *Aeromonads* in the preclarification with the subtraction process. There are shown two distributions of the bacterial frequency against the strength of the immunofluorescence in a red fluorescence range in which only bacteria are detected, the DNA content of which corresponds to that of the *Aeromonads*. The open curve represents the preclarification sample labelled with zero sera and the shaded curve those labelled with *Aeromonas* antiserum. By subtraction, there is obtained the distribution of the pure *Aeromonads*, the proportion thereof in the total population being 43%. In FIG. 5d is illustrated the result after measurement of a pure culture of *Aeromonas*.

Under a fluorescence microscope, in the activated sludge is to be recognised a bacterium which is conspicuous due to its characteristic antibody binding on the poles and in the middle. This strain is limited to the activated sludge tanks and the related antiserum shows only a low cross-reactivity with other bacteria of the activated sludge. Hitherto, it has not been possible to identify this micro-organism; it has been designated K3.

FIG. 6 of the accompanying drawings shows the measurement of the bacterium K3 in the activated sludge and the sorting out of the bacterium from the mixture. The limited regions indicated in FIGS. 6a and 6b with 3 and 4 mark off the measurement regions which are characteristic for K3. Bacteria from these regions were sorted out and again measured in FIGS. 6c and 6d. The measurement of an antiserum activated sludge sample gives the distribution pattern illustrated in FIGS. 6a and 6b. Not only in the case of simultaneous measurement of the immunofluorescence against the 90° scattered light but also against the DNA content, there is only one distinct measurement region for this bacterium which can here be quantified without subtraction. In addition, with the cell sorting machine ("fluorescence activated cell sorting"), bacteria were sorted out from this measurement region and then again measured in a cytometer. As is shown in FIGS. 6c and 6d, there is given a uniform cell population.

d) Measurement of a metabolic-physiological performance, the esterase activity, with flow cytometry.

Figure 7A:
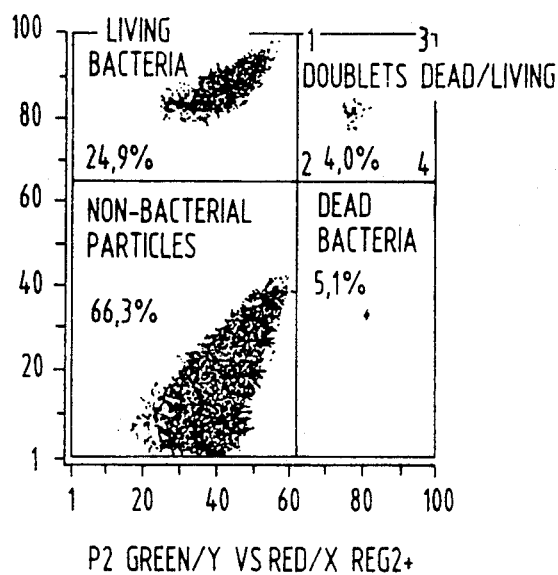
Figure 7B:
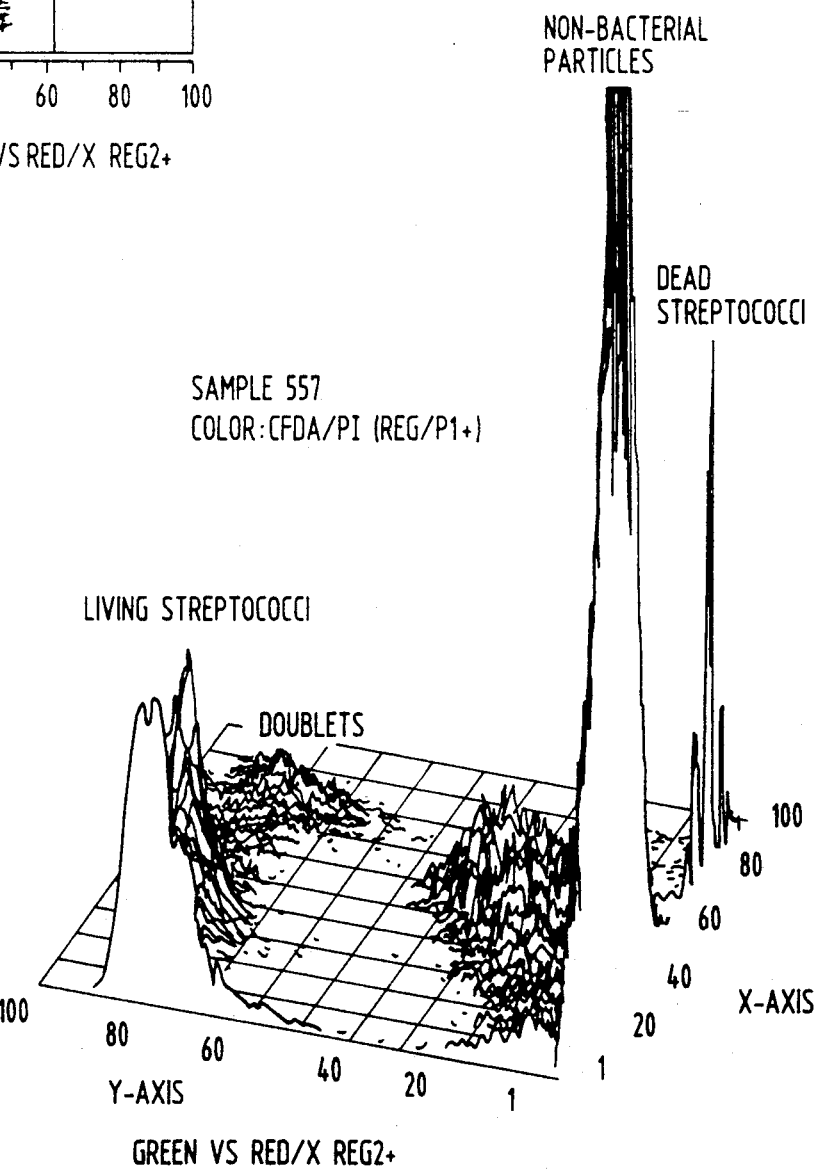
Figure 9A:
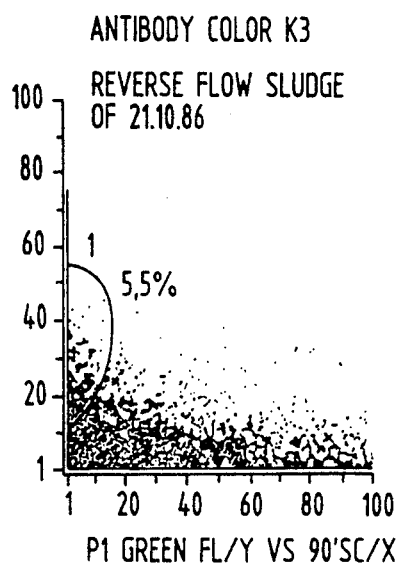
Figure 9B:
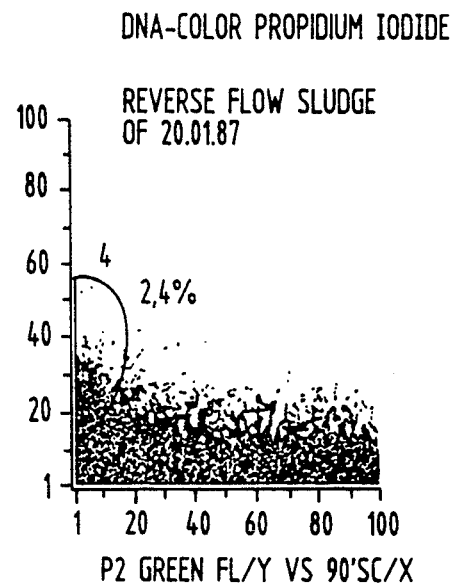
Figure 9C:
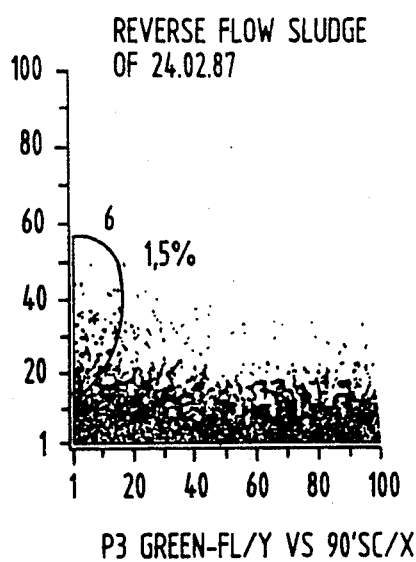
Figure 9D:
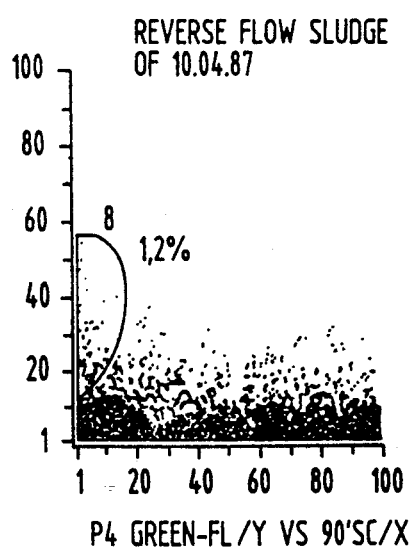

A pure culture of bacteria of the species *Streptococcus faecalis* (see Table 1) was isolated, washed and then incubated for 15 minutes with the fluorogenic substrate carboxyfluorescein diacetate. After washing the cells by centrifuging and colouring with the dyestuff propidium iodide, the bacteria were measured in a flow cytometer (FIG. 7). The evaluation shows that 24.9% of the particles are living *Streptococci* which, after cleavage of the non-fluorescent carboxyfluorescein diacetate, have incorporated the green fluorescent product fluorescein within the cell but show no red fluorescence because they exclude the DNA dyestuff propidium iodide. 5.1% of the bacteria are only red fluorescent, i.e. dead. 4.0% are doublets of a living and a dead cell and 66.3% of the particles are not bacteria but presumably carbohydrate polymers which have been secreted into the nutrient medium by *Streptococcus*.

With this method, in samples of activated sludge and inflow into the activated sludge tanks, dead and esterase-containing living bacteria and via the scattered light, esterase-free living bacteria and particles which are not bacteria can be differentiated from one another and quantified.

e) Determination of clarification plant bacteria depending upon the time of the year.

Activated sludge samples were taken weekly from October 1986 to July 1987 and frozen in glycerol at −70° C. Several of these samples were then thawed and the *Aeromonads* quantified not only with the punch method but also according to the present invention with flow cytometry. In most cases, agreement was found between the two test processes. Deviations can be explained with the above-described inaccuracy of the punch method. FIG. 8 of the accompanying drawings shows the frequency of *Aeromonas* and sludge volume index at the change of the year. It can be seen that in the winter months the *Aeromonads* disappear almost completely from the activated sludge tanks. Measurements on pre-clarification samples from this time give the same findings. Bacterium K3 specific for the activated sludge tanks also disappears in winter from the activated sludge tanks (cf. FIGS. 9a-9g, which show the flow cytometric measurement of the bacterium K3 at the change of the year). In these months, the operational parameters in the clarification plant change drastically. Together with a decrease of the nitrification from 90% to 10 to 20%, the filamentary bacterium 012N occurred in masses in the middle of December and gave rise to an intumescent sludge problem. From the middle of January to the middle of March, the further filamentary bacteria of types 0961 and 1852 and *Sphaerotilus natans* also occurred in addition, 021N being maintained. A brief disappearance of 021N for 2 weeks in the month of June and July is interesting (cf. FIG. 10 which shows the microbiological state of the clarification plant, the biochemical oxygen requirement loading of the waste water and sludge volume index in June and July, 1987). Previously, there was a great hydraulic loading of the clarification plant and a corresponding decrease of the biochemical oxygen requirement concentration. Parallel, an increase of the *Aeromonads* and, via a microscopic estimation, of the *Protozoa* was observed. About 2 weeks later, 021N again appeared strongly, a decrease of the *Aeromonads* having previously taken place.

These measurements show that changes in the clarification plant biology take place on a broad front and indicate happenings already in the canalisation. A rapidly growing bacterium, such as *Aeromonas*, appears suitable for indicating already in a very early stage for example an intumescent sludge problem. Only with the flow cytometry can these potential indicator bacteria be quantified so quickly that, in the scope of the control of the clarification plant, countermeasures can be taken, such as the addition of iron salts, whereby the explusion of the activated sludge is avoided at an early stage, or of fertilisers for the suppression of micro-organisms such as type 021N which give rise to intumescent sludge.

This is the first example of how knowledge obtained with flow cytometry can be used for the ecology of the clarification plant and the quantification of indicator bacteria for the control of the clarification plant.

Furthermore, the knowledge is important that a large part of the bacteria in an activated sludge tank do not grow there but rather in the canalisation and are introduced into the activated sludge tank. Thus, they previously digest the waste water and can thus, via the substrate availability, exert an influence on the microbiological occurrences in the activated sludge tanks (see also FIG. 1).

An important known example for this is the biological dephosphatisation. Only when the incoming waste water has been sufficiently predigested by *Aeromonas* can it result in a phosphate take-up by *Acinetobacter* in the activated sludge tank (K. Brodisch, gwf-Wasser-Abwasser, 126, 237–240/1985). A quantification of *Aeromonads* with flow cytometry could be used for the control of this process.

f) Quantification of nitrificants.

Nitrificants are a group which are biologically difficult to detect since they cannot be plated out on solid nutrient media and only grow in a liquid special medium with a doubling time of 10 to 24 hours (for comparison, the doubling time for *Aeromonas* is 20 minutes). Because of these difficulties, it is impossible to quantify with conventional microbiological methods this group of organisms which is important for clarification plant technology.

With the process according to the present invention, here, too, a control is possible via a quantification. Two bacterial strains were isolated, one of which oxidises ammonium to nitrite and the other nitrite to nitrate. After the production of antibodies against these bacteria, these microorganisms can be observed in a clarification plant.

g) Control possibilities via the measurement according to the present invention of indicator bacteria such as are listed in Table 1.

1. Avoidance of intumescent sludge

Via immunofluorescence with the microscopic image analysis or flow cytometry, bacteria giving rise to intumescent sludge, such as types 021N, 0961 and 1852, and *Sphaerotilus natans*, could be quantified, described in their growth behaviour and precision measures introduced for combating them, such as reduction of the oxygen supply, fertilisation of the flock formers and the like.

The bacteria which cause a healthy flock structure, such as *Zoogloa spec., Pseudomonas oryzihabitans* and certain isolates of *Acinetobacter* and *Athrobacter spec.*, can also be observed in their growth and precise measures introduced for their maintenance, especially fertilising measures or the addition of inoculation material.

Via the analysis of the course of the activated sludge tank, indicator bacteria, such as *Aeromonas* (indicator for domestic waste water, see above), *Pseudomonas fluorescens* (indicator for chemically contaminated industrial waste water) and the like, can be quantified and conclusions made with regard to the composition and origin of the waste water. This could indicate an intumescent sludge problem very early and the above-mentioned countermeasures could be introduced in good time.

2 Maximum nitrification

With the process according to the present invention, the concentration of the nitrificants *Nitrosomonas spec.* and *Nitrobacter spec.* can be determined and, in the case of a decrease thereof, countermeasures can be taken: increase of the sludge age, introduction of immersed bodies, increase of the tank temperature and introduction of suitable inoculation material with high nitrification concentration.

3. Biological dephosphatisation

According to the present invention, the concentration of the *Aeromonads* and of the phosphateaccumulating bacteria (e.g. *Acinetobacter*) is determined. As has already been described in paragraph e), a high *Aeromonad* concentration in the run-in into the activated sludge tank is a prerequisite for the optimum fermentation of the waste water and thus nutrition of phosphate-accumulating bacteria, for example of *Acinetobacter*, in the activated sludge tanks with organic acids.

Via the following measures, the concentration of these bacteria could be kept constant and thus the process controlled: mixing of waste water with low *Aeromonas* concentration with waste water with high values for this bacterium for the achievement of an optimum concentration; and admixture of suitable inoculation material with high *Aeromonas* or *Acinetobacter* concentrations.

4. Metabolism of substances which are difficult to break down

According to the present invention, indicator bacteria for the contamination of the incoming water with substances which are difficult to break down, for example *Pseudomonas fluorescens*, are quantified and traced back over the canalisation to the cause thereof.

Specialists for the breakdown of these substances are quantified in the activated sludge tanks according to the present invention and the concentration thereof kept constant by the addition of a suitable inoculation material. There can here be used, in particular, methods of labelling of a special metabolic performance with fluorogenic substrates with quantification via the flow cytometry principle or microscopic image analysis. The bacteria types *Acinetobacter spec., Pseudomonas aeruginosa, fluorescens* and *putida, Arthrobacter spec.* and *Rhodococcus spec.* appear to be especially suitable for the metabolism of substances which are difficult to break down (for example aromatics, halogenated hydrocarbons, aliphatics, tensides and detergents).

5. Elimination of pathogenic micro-organisms in clarification plant

Micro-organisms which are pathogenic for humans and animals (such as the *Salmonella spec., Pasteurella spec., Shigella flexneri* and *Pseudomonas aeruginosa* listed in Table 1) are quantified according to the present invention in the outlet of the clarification plant into the main canal. In the case of exceeding a particular threshold value, the period of residence of the incoming waste water in the activated sludge tanks is increased and thus, according to experience, there is achieved a better elimination of the pathogenic micro-organisms.

Some of the here-mentioned possibilities of control of clarification plant, such as the residence time of the waste water, dosing in of bacteria or tank temperature, can be achieved by regulatable pumps or heating elements. As electronic regulating value, there can be used the concentration of certain leading organisms which, according to the present invention, can be automatically determined in a measurement detection point, based on flow cytometry, on the inlet and in the activated sludge tank itself.

It will be understood that the specification and examples are illustrative but not limitative of the present invention and that other embodiments within the spirit and scope of the invention will suggest themselves to those skilled in the art.

What is claimed is:

1. A process for the control of a biological clarification stage of an aerobic activated sludge type containing micro-organisms, comprising:

monitoring at least one of the micro-organisms most frequently present in the activated sludge continuously and quantitatively by means of a representative sample of the micro-organism from the activated sludge or from an inlet of a containment vessel of the activated sludge wherein the micro-organism is bound to a fluorescence-labelled antibody specific for the micro-organism or reacting the micro-organism with a fluorogenic substrate by means of a metabolic ability specific to the micro-organism, determining the amount of the fluorescencelabelled micro-organism by flow cytometry and, simultaneously determining the total amount of the micro-organism present by scattered light measurement of coloration of the DNA and, regulating the amount of at least the one micro-organism or the growth conditions for this micro-organism with reference to the above measurement values obtained.

2. The process of claim 1, comprising monitoring at least one of the micro-organisms selected from the group consisting of types 021n, 0961 and 1852, *Sphaerotilus natans, Zoogloa spec., Pseudomonas oryzihabitans,* isolates of *Acinetobacter calcoaceticus, Nitrosomonas spec., Nitrobacter spec., Aeromonas hydrophila, Acinetobacter calcoaceticus, Acinetobacter spec., Pseudomonas aeruginosa, fluorescens* and *putida, Arthrobacter spec., Rhodococcus spec., Salmonella spec., Pasteurella spec., Pasteurella spec., Shigella flexneri, Escherichia coli, Aeromonas hydrophila, Klebsiella pneumoniae* and *Pseudomonas Fluorescens*.

3. The process of claim 1 or 2 comprising monitoring at least one micro-organism which is responsible for conditions selected from the group consisting of swollen sludge, nitrification, biological dephosphatization, metabolism of substances which are difficult to break down, infections of humans and animals and for the assessment of the quality and origin of the waste water introduced.

4. The process of claim 3 further comprising monitoring at least one micro-organism responsible for dephosphatization.

5. The process of claim 3 further comprising monitoring at least one micro-organism responsible for nitrification regulation.

6. The process of claim 3 further comprising quantifying the micro-organism most frequently in the waste water and activated sludge at measurement value detection points via the flow cytometry principle or by microscopic image analysis, and regulating the clarification plant via the measurement signal.

7. The process of claim 1, further comprising, indicating and quantifying intracellular metabolic performances by means of fluorogenic substances via flow cytometry or microscopic image analysis.

8. The process of claims 1 or 2 further comprising quantifying the micro-organism most frequently in the waste water and activated sludge at measurement value detection points via the flow cytometry principle or by microscopic image analysis, and regulating the clarification plant via the measurement signal.

9. The process of claim 8, further comprising carrying out the monitoring and regulation fully automatically.

* * * * *

UNITED STATES PATENT AND TRADEMARK OFFICE
CERTIFICATE OF CORRECTION

PATENT NO. : 5,173,187
DATED : December 22, 1992
INVENTOR(S) : Werner Nader, et al.

It is certified that error appears in the above-identified patent and that said Letters Patent is hereby corrected as shown below:

Col. 1, line 6: before "present" (first word) insert -- The --.

Col. 3, line 34: change "influenca" to -- influence --.

Col. 6, line 64: after the table insert

-- *) count of the pure isolates
  a) under Zoogloa spec. were classified all gram-negative non-fermentative, motile and oxidase-containing bacteria which grow in flocks in liquid culture and which cannot be clearly classified as a Pseudomonas type. --.

Signed and Sealed this

Twenty-sixth Day of April, 1994

BRUCE LEHMAN

Attest:

Attesting Officer

Commissioner of Patents and Trademarks